United States Patent
Steer et al.

(10) Patent No.: US 9,325,677 B2
(45) Date of Patent: Apr. 26, 2016

(54) METHOD OF REGISTERING DEVICES

(75) Inventors: David G. Steer, Nepean (CA); Stephen McCann, Southampton (GB); Dongsheng Yu, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 1215 days.

(21) Appl. No.: 12/781,585

(22) Filed: May 17, 2010

(65) Prior Publication Data

US 2011/0282915 A1 Nov. 17, 2011

(51) Int. Cl.
| | |
|---|---|
| G06F 21/10 | (2013.01) |
| H04W 12/00 | (2009.01) |
| H04L 12/00 | (2006.01) |
| H04L 29/06 | (2006.01) |
| G06F 21/62 | (2013.01) |
| G06F 21/31 | (2013.01) |

(Continued)

(52) U.S. Cl.
CPC .......... *H04L 63/06* (2013.01); *G06F 17/30595* (2013.01); *G06F 21/10* (2013.01); *G06F 21/31* (2013.01); *G06F 21/445* (2013.01); *G06F 21/6218* (2013.01); *H04L 9/0825* (2013.01); *H04L 9/3263* (2013.01); *H04L 9/3271* (2013.01); *H04L 63/0428* (2013.01); *H04L 63/0471* (2013.01); *H04L 63/0823* (2013.01); *H04L 63/0869* (2013.01); *H04W 12/04* (2013.01); *H04W 12/06* (2013.01); *H04L 2463/062* (2013.01)

(58) Field of Classification Search
CPC ... G06F 21/31; G06F 21/44; G06F 17/30595; H04L 67/104; H04L 2209/60; H04L 63/0428; H04L 63/0471; H04L 2463/041

USPC ............... 707/694, 697–699, 747, 756–758; 709/203–206, 215–217, 228–229; 705/26.1–26.35, 50–51, 56–59; 713/168; 726/3, 9; 382/112–116; 380/277–279, 282, 44–45
See application file for complete search history.

(56) References Cited

U.S. PATENT DOCUMENTS

| | | | |
|---|---|---|---|
| 5,745,571 | A | 4/1998 | Zuk |
| 6,957,344 | B1 | 10/2005 | Goldshlag et al. |

(Continued)

FOREIGN PATENT DOCUMENTS

| | | |
|---|---|---|
| CN | 101652782 A | 2/2010 |
| TW | 200826589 A | 6/2008 |
| WO | 03091858 A2 | 11/2003 |

OTHER PUBLICATIONS

COGEU,FP7 ICT-2009.1.1—Contract No. INFSO-ICT-248560 COgnitive radio systems for efficient sharing of TV white spaces in EUropean context, Apr. 2010, pp. 1-109.*

(Continued)

*Primary Examiner* — Srirama Channavajjala
(74) *Attorney, Agent, or Firm* — Conley Rose, P.C.; J. Robert Brown, Jr.

(57) ABSTRACT

A telecommunications device is provided. The telecommunications device comprises a processor configured such that the device sends a first message to a database management component, the first message containing a communications key encrypted by a database management component key. The processor is further configured such that the device receives a second message from the database management component, the second message encrypted by the communications key. The processor is further configured such that, when the device is able to decrypt the second message, the device considers the database management component to be legitimate.

31 Claims, 11 Drawing Sheets

(51) Int. Cl.

| | | |
|---|---|---|
| *G06F 21/44* | (2013.01) | |
| *G06F 17/30* | (2006.01) | |
| *H04L 9/08* | (2006.01) | |
| *H04L 9/32* | (2006.01) | |
| *H04W 12/04* | (2009.01) | |
| *H04W 12/06* | (2009.01) | |

(56) References Cited

U.S. PATENT DOCUMENTS

| | | |
|---|---|---|
| 7,149,223 B2 | 12/2006 | Liva et al. |
| 7,197,045 B2 | 3/2007 | Amit |
| 7,249,371 B2 | 7/2007 | Barkan et al. |
| 7,697,691 B2 * | 4/2010 | Sutton et al. .................. 380/277 |
| 8,532,488 B2 | 9/2013 | Nielsen et al. |
| 2003/0066087 A1 | 4/2003 | Sawyer et al. |
| 2003/0200336 A1 | 10/2003 | Pal et al. |
| 2003/0217137 A1 | 11/2003 | Roese et al. |
| 2003/0217150 A1 | 11/2003 | Roese et al. |
| 2003/0217151 A1 | 11/2003 | Roese et al. |
| 2004/0141747 A1 | 7/2004 | Kenny et al. |
| 2004/0244043 A1 | 12/2004 | Lind et al. |
| 2006/0005253 A1 * | 1/2006 | Goldshlag et al. .............. 726/26 |
| 2006/0106836 A1 * | 5/2006 | Masugi et al. ................. 707/101 |
| 2006/0136702 A1 * | 6/2006 | Vantalon et al. .................. 713/1 |
| 2007/0189770 A1 | 8/2007 | Sucharczuk et al. |
| 2007/0288623 A1 * | 12/2007 | Kato et al. .................... 709/223 |
| 2007/0300294 A1 | 12/2007 | Netanel et al. |
| 2008/0034437 A1 | 2/2008 | Patterson |
| 2008/0092173 A1 | 4/2008 | Shannon et al. |
| 2008/0141359 A1 | 6/2008 | Lee et al. |
| 2008/0175386 A1 | 7/2008 | Bestermann |
| 2009/0034508 A1 * | 2/2009 | Gurney et al. ................. 370/351 |
| 2009/0204817 A1 * | 8/2009 | Deana-Roga et al. ........ 713/171 |
| 2010/0033300 A1 | 2/2010 | Brandin |
| 2010/0150351 A1 | 6/2010 | Sutton, II et al. |
| 2010/0161989 A1 * | 6/2010 | Kosaki .......................... 713/171 |
| 2010/0293095 A1 | 11/2010 | Adkins et al. |
| 2010/0309317 A1 * | 12/2010 | Wu et al. ....................... 348/180 |
| 2011/0182583 A1 | 7/2011 | Rakib |

OTHER PUBLICATIONS

Evan Kwarel et al. "A proposal for a rapid transition to market allocation of spectrum", Nov. 2002, pp. 1-62.*

PCT International Search Report; Application No. PCT/CA2011/050310; Aug. 30, 2011; 3 pages.
PCT Written Opinion of the International Searching Authority; Application No. PCT/CA2011/050310; Aug. 30, 2011; 4 pages.
Chen, Hou-Shin, et al.; Title: MAC and PHY Proposal for 802.11af; IEEE 802.11-10/0258r0; Mar. 2010; 23 pgs.
Research in Motion Limited; PCT Application No. PCT/CA2010/001259; RIM 36483-ID; Title: System and Method for Mobile Network Inter-Device Communications; Filing Date: Aug. 19, 2010.
Steer, David G.; U.S. Appl. No. 13/350,648, filed Jan. 13, 2012; Title: Device Verification for Dynamic Re-Certificating.
Steer, David, et al.; "Considerations for the "Re-Certificating" of Reconfigurable Radio Equipment Post Deployment"; Research in Motion; Advanced Technology Laboratories; 7 pages.
IEEE Wireless Communications Magazine; "Cognitive Radio Networks: A Practical Perspective"; 3 pages.
Taiwan Office Action; Application No. 100117269; Sep. 27, 2013; 11 pages.
Taiwan Office Action; Application No. 100117269; Apr. 8, 2014; 10 pages.
Canadian Office Action; Application No. 2,799,288; Apr. 4, 2014; 2 pages.
Canadian Office Action; Application No. 2,801,375; Apr. 29, 2014; 6 pages.
Final Office Action dated Jul. 7, 2014; U.S. Appl. No. 13/350,648, filed Jan. 13, 2012; 16 pages.
European Partial Search Report; Application No. 10188836.0; Jul. 10, 2015; 6 pages.
Chinese Office Action; Application No. 201180035217.0; Jul. 27, 2015; 8 pages.
Canadian Office Action; Application No. 2,801,375; Aug. 27, 2015; 3 pages.
Office Action dated Nov. 26, 2013; U.S. Appl. No. 13/350,648, filed Jan. 13, 2012; 20 pages.
Advisory Action dated Oct. 23, 2014; U.S. Appl. No. 13/350,648, filed Jan. 13, 2012; 5 pages.
Chinese Office Action; Application No. 201180035217.0; Nov. 3, 2014; 23 pages.
Canadian Office Action; Application No. 2,799,288; Feb. 20, 2015; 3 pages.
European Extended Search Report; Application No. 10188836.0; Nov. 11, 2015; 13 pages.
Chinese Office Action as Received in Co-pending Application No. 201180035217.0 on Jan. 28, 2016; 3 pages.

* cited by examiner

METHOD OF REGISTERING DEVICES

BACKGROUND

Television broadcasts in the United States have recently switched from analog communication to digital communication. The frequency bands that have been made available by this switch are referred to as TV white space (TVWS). A device that can use TVWS is referred to as a TV band device (TVBD), or might be referred to herein simply as a device. A TVBD may be a fixed device (e.g., an access point), a mobile/portable device, or both.

The Federal Communications Commission (FCC) in the United States has established regulations for TVWS channel usage that require TVBDs to be registered with a database manager and to consult a database of available TVWS channels before transmitting on any TVWS channels. This is necessary in order to assure coordination of usage with the primary broadcasting services. A TVBD must also provide the database with information about its ownership and operation. This information is to be made available to the FCC to assist in the mitigation/resolution of interference between primary users (TV broadcast systems) and TVBDs. Hereinafter, the term "FCC" might refer specifically to the communications regulatory agency in the United States or generically to any communications regulatory agency.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The procedures specified by the FCC regulations do not include any means to authenticate either the TVBD or the databases or to insure the privacy of the operator's information. Without such authentication procedures, the registration, channel assignment, and coordination process is open to abuse and to causing interference among users. The embodiments described herein provide methods and apparatus to facilitate the authentication of the TVBD and the databases that are simple and low cost. These techniques do not require specialized hardware in the TVBD and also provide privacy protection for the TVBD's location and commercial information. While the embodiments disclosed herein will be described in the context of the authentication of TVBDs and their associated databases, it should be understood that these descriptions are merely examples. The methods and apparatus disclosed herein may be applicable to other components and in other situations.

By way of background, a description is now provided of the scenario that the FCC requires for a TVBD to register and consult with a TVWS database. Although this description is specific to the FCC's regulations, other jurisdictions (e.g., EU, OFCOM) have similar requirements for database access for white space channel assignments, and the embodiments herein are also applicable to such other environments.

Figure 1:
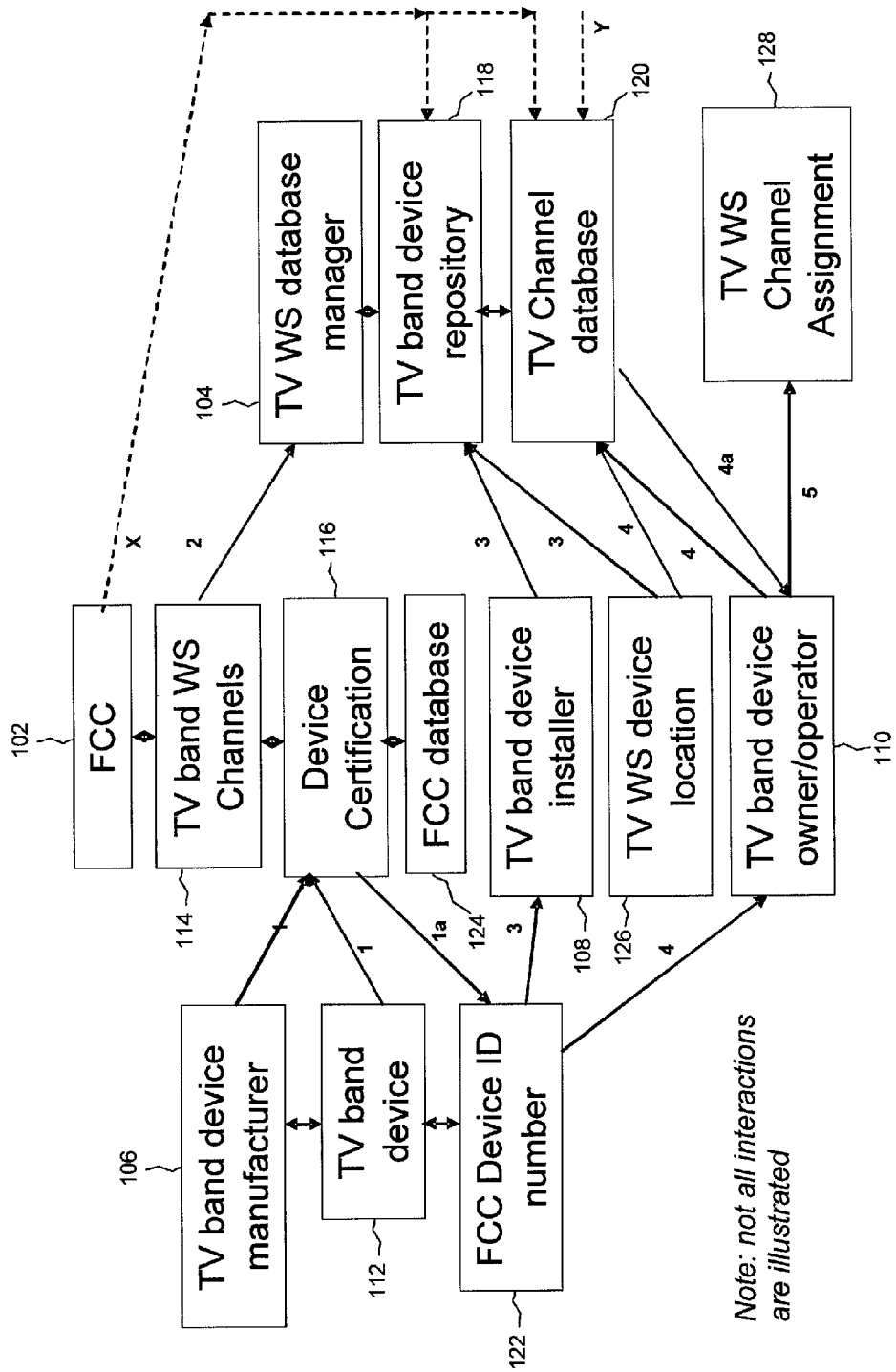
FIG. 1 illustrates television band device (TVBD) certification and registration and television white space channel assignment.

The registration and channel assignment process as outlined by the FCC is depicted in FIG. 1. The illustration shows the relationship among the regulator ("FCC") 102, the TVWS database manager 104, the TVBD manufacturer 106, the TVBD installer 108, and the TVBD owner/operator 110. The objective of the process is for a TVBD 112 to be given a TVWS channel assignment that is coordinated with the primary usage of the TV band's local broadcasting (and broadcast auxiliary) services.

The FCC 102 administers the TVWS channels 114 and provides a process to provide device certification 116 through its testing laboratories and procedures. TVWS channel management is delegated to a number of TVWS database managers (line 2) 104. Although only one TVWS database manager 104 is illustrated in the figure, a plurality of TVWS database managers could be present. The TVWS database manager 104 is responsible for maintaining records of TVBDs 112, their usage of channels, and their location in a TVBD repository 118. The database manager 104 also maintains a TV channel database 120 that indicates the availability of white space channels for each location. The dotted line X in the diagram denotes the delegation of the functions of the repository 118 and the database 120 to the database manager 104 and that the FCC 102 may access the information in the database manager's files. The database manager 104 is also required to share aspects of its information with other database managers. The dotted line Y indicates that the channel database 120 may also contain information about channel availability in addition to that provided by the FCC's records (e.g., cable head-end receiver locations and information from other database managers).

When the TVBD manufacturer 106 develops a TVBD 112, the device 112 is certified as compliant with the FCC's applicable regulations (e.g., by testing in the FCC's laboratories) (lines 1). When this certification is achieved, the manufacturer 106 receives an FCC device ID number 122 for the product (line 1a). The FCC 102 maintains its own files (FCC database 124) of certified devices 112 and their manufacturers 106 and FCC ID numbers 122. The FCC device ID number 122 is a device model identification and not a serial number for identifying an individual device. Individual devices 112 with FCC ID numbers 122 also have their own unique serial numbers.

When the TVBD 112 is sold, the TVBD installer 108 registers the device 112 with the TVWS database 120 using the FCC device ID number 122 and the TVWS device's location 126 (where it is installed). The TVWS database manager 104 stores the device's information (FCC ID number 122 and location 126 as well as details of the device owner 110) in the TVBD repository 118 (lines 3). The information required by the FCC 102 for entry into the database repository 118 when either a mobile TVBD 112 or a fixed TVBD 112 is registered for operation includes the device's FCC ID number 122, serial number, and location 126. For a device 112 in a fixed location, additional information that is to be provided includes the name of the individual or business that is responsible for the device, the name of a contact person responsible for the device's operation, an address for the contact person, an email address for the contact person, and a phone number for the contact person.

When the TVBD owner/operator 110 (who may also be the installer 108) wishes to use a TVWS channel 114 for communications, the owner/operator 110 contacts the TVWS database manager 104 (referencing the device's current location 126) and inquires about available channels at the device's location 126 (lines 4). The response from the TVWS database manager's TV channel database 120 may list the available TVWS channels 114 (line 4a). In some locations there may be no TVWS channels 114 available. The device 112 may choose one of the available channels 114 as its TVWS channel assignment 128 (line 5). The list of available channels 114 may also be received by the TVBD 112 at the time of registration, but the TVBD 112 is required to maintain periodic contact with the TV channel database 120 to be informed of any changes in the channel availability for its location.

The FCC 102 may appoint more than one database manager 104, which may also be referred to herein as the "registrar". The managers 104 may provide their services in a stand-alone manner or in cooperation with other managers 104. The database manager 104 and the registrar may be the same entity, or they may be separate. The plurality of database managers 104 share information about registrations with each other. Database managers 104 may also include in their databases 120 other systems operating in the TV bands such as TV-cable head end locations and other broadcast auxiliary services (e.g., wireless microphones). Including these types of systems in the database 120 protects their operation by assuring their local areas are excluded from TVBD operation.

In the FCC's regulations, the TVWS database managers 104 are permitted to charge fees for registration and for queries to their database 120 of available channels. Some TVWS database managers 104 may expect to make a business from the charging of fees for registration and queries to the database 120 to check for available channels. Registration of each TVBD 112 is required when it is first deployed. The channel database queries are required of fixed TVBDs 112 at installation/power-on and periodically thereafter (e.g., 24 hours). Mobile devices 112 must also register with the database registrar/manager 104 at power-on and check the channel availability each time they change their location or at a maximum interval of 24 hours.

As there are regulatory requirements for devices to interact with the database regularly, it may be desirable to have procedures whereby the devices and database managers can guard against fraud, particularly as there may be fees involved for registration and each database query interaction. TVBDs may need to verify that they are registering and querying legitimate database managers, and the database managers may need to verify that they only register and interact with certified TVBDs (and other certified database managers) and that their fees can be collected. Also, especially for mobile devices which may change location frequently, it is desirable to keep query charges to a minimum and for charges to be allocated to the correct TVBD or account. As the interactions among the devices and the database managers may transpire over the Internet there is the potential for "impersonating" managers to be created to falsely collect fees and for "cloned" devices to be created to obtain access to the TVWS channels by charging the fees to other devices. Some TVBD users and some regulatory domains may also have concerns about the privacy of location and commercial information associated with their TVBDs.

While there are many security methods in use in the Internet, it is desirable that the security methods used by TVBDs be of extremely low cost as they are competing in a market in which alternative bands may not have database managers and fees may not be collected. TVBDs should not be required, for example, to implement complex, computationally intensive cryptographic processes or to be involved in complex protocol interactions with the database managers. Because of the large volume and the low cost of TVBDs (e.g., millions of devices sold per year), it is also not practical for each of the devices and the database managers to hold individual secret keys or for there to be prearranged shared secrets between the database managers and the TVBDs.

For example, the common Internet security methods often have two stages. One establishes a secure ("private") link between the two ends of the connection. The second authenticates the end devices (e.g., verifies their identity). These stages may be independent; that is, some methods may not establish a secure link, and some combine the secure link and authentication process. In a typical Internet exchange, a secure link is established and then the devices are authenticated using an exchange of a user name and a password. Authenticating TVBDs with a user name and password is undesirable as it requires a prearranged name and password to be established for each individual device, which is impractical for many millions of low cost devices.

Other Internet protocols, such as Extensible Authentication Protocol-Transport Layer Security (EAP-TLS) for example, make use of public key cryptography techniques in which each device has a unique public/private key pair. However, for device authentication, the public key of each device needs to be known to the database manager. This is usually achieved using a trusted authority ("certificate authority") which holds all the public keys and can provide a certified copy of the key to the database manager wanting to authenticate the TVBD. However, undesirably, this involves the expense and complexity of another database and also requires the TVBD to be capable of performing complex public key cryptographic procedures.

It may also not be practical to use the authentication techniques (e.g., a Subscriber Identification Module (SIM) card) used by some mobile phone systems. Such systems require a preregistration of each individual mobile phone account with a service provider (or network operator), and only that provider may verify the device's identity. Some protocols (e.g., EAP SIM and EAP AKA) are available to enable a mobile device's authenticity to be confirmed to an outside party, and these may be used to authenticate TVBDs that are also mobile network devices. However, generally, it is not practical for every TVBD to also maintain a mobile network subscription. The common Internet and mobile network security protocols are thus not suitable by themselves for simple and low cost mutual authentication between a TVBD and a database manager.

Although there has been discussion of the concept of the database managers providing their services free of charge, which would minimize the need for TVBD security processes, such a practice seems unlikely due to there being a real cost involved in managing the TVWS registration service and database as stipulated by the FCC's regulations. Even if the database queries are free, there are still communications charges that may be applicable.

In addition to these security concerns, TVBDs may need to be able to register automatically after sale (i.e., they may not be preregistered). TVBDs may also need to change their registration if they move to new locations or if new database managers are assigned or business arrangements evolve.

It would be advantageous for there to be a method of providing security among TVBDs and database administrators that did not require additional cryptographic processes in the TVBDs and that did not require secrets (e.g., keys) to be assigned and maintained between devices and database managers or key authorities or security servers. The method should protect against impersonators acting as database managers (for collecting fees) and for device identities being cloned to avoid paying channel database access fees. It would be advantageous if the method accommodated changes in ownership and business arrangements for device owners and database managers and provided protection against common Internet scams and denial of service attacks. It would also be advantageous if the registration and TVWS database inquiry process protected the privacy of the location and contact information of the TVBD.

The embodiments disclosed herein address these issues with the objective of minimum cost to the TVBD operator, manufacturer, and database operator. The embodiments place no requirement, for example, for the database managers to maintain lists of secret keys for TVBDs. There is also no requirement for a TVBD to have any knowledge of the keys or cryptographic process associated with its certificate. The methods and apparatus provided in these embodiments provide a superior method of assuring device registrations and database queries that is simple to implement, inexpensive, secure enough, ensures privacy of user information, is resilient to attack, and is adaptable to changes in procedures, regulations and business arrangements.

Although the embodiments are described herein in the context of interaction with a database manager for opportunistic spectrum assignments such as the TVWS, the embodiments can also be used for other applications such as location-based services (or other network-based services) where it is desired to mutually authenticate the devices and server as well as to protect the information sent by the device but without the requirements for prearranged common secrets to be known to each device and the server. These embodiments are also applicable to any scenario in which a database manager assists in the allocation of radio resources (e.g. channels and timing) to mobile devices such as may occur in licensed, cross licensed or unlicensed assignments. These embodiments ensure that the device is receiving authorized information from the database manager and so may legally operate its radio apparatus according to the information received. This ensures the safe and interference-free operation of the devices.

The present embodiments provide a method and apparatus for the interaction of devices with a managerial database. The embodiments make use of encryption techniques using a combination of public and private keys to enable mutual authentication of the devices and the database and to provide privacy protection for information provided to the managerial database repository. The privacy protection may be used, for example, to ensure the protection of the device's location and commercial details. In an embodiment, the device includes a storage apparatus for the keys and commercial information and processing apparatus for interaction with the database manager. The embodiments do not require preregistration of the devices with the manager or the sharing of secrets arranged between the devices and the database manager. The embodiments establish sufficient authentication with a single message and reply between the device and the database manager and thus are of very low cost to implement and operate while minimizing the signaling overhead.

The present embodiments provide security for the TVBD and database managers by making use of certificates installed by the manufacturer in the TVBD as part of the manufacturing process. This certificate is created through the use of public/private keys of the manufacturer, the regulator, and one or more database managers. The verification procedure makes use of the cryptographic capability that is embedded in the TVBD for communications and so does not require special apparatus or processes to ensure secure database interactions. Privacy of the location information is provided through a hierarchy of location information protected with independent keys.

The present embodiments enable secured communication between the TVBD and the database manager with only a single inquiry and a single response message. It is not necessary to exchange a series of multiple messages to establish authenticity. This is an advantage over existing methods of authentication, which may require multiple challenge/response exchanges to establish a secure channel and authenticity.

In summary, a manufacturer's certificate is included in a TVBD at approximately the time of manufacture so that the database manager and the TVBD can mutually authenticate one another. When the TVBD sends a registration message or a TVWS channel inquiry message to the database manager, the TVBD includes the certificate in the message. The database manager uses a private key to extract information from the certificate and uses that information to verify the authenticity of the TVBD. The database manager then uses a key included in the certificate to encrypt a message that it returns to the TVBD. The message returned to the TVBD might contain information about TVWS channels that are available in the vicinity of the TVBD. If the TVBD successfully decrypts this message, it verifies the authenticity of the database manager. Private information about the TVBD is kept encrypted and unavailable to the database manager. However, this private information can be made available to a regulatory agency through the use of a regulator's certificate. While these features are described herein as being used in combination with one another, it should be understood that each of these features could be used without the others.

Details of these embodiments will now be provided. In an embodiment, the manufacturer, at approximately the time of manufacture, installs in the TVBD a certificate that includes a device key that is unique to each device. It should be noted that the word "certificate" as used herein has a somewhat different meaning and structure than the use of "certificate" in common security protocols. In common with typical certificates, the certificates disclosed herein are exchanged objects that enable the verification of communicating nodes. However, the structure of the certificates disclosed herein also includes some information fields, and their usage and verification differ from the standardized (signature) hash certificates of other communications protocols. The certificates disclosed herein contain a number of unique elements that are discussed in more detail below.

The manufacturer's certificate is encrypted, and in some cases signed, using the manufacturer's private key. The manufacturer's corresponding public key is made publicly available. For example, the public key might be published on the manufacturer's web site, the address of which may be obtained either on the FCC's web site or from the database manager's information store. In an alternative embodiment, the manufacturer's public key may be issued by a regulator-owned/managed certificate authority. In additional alternative embodiments, there may be a separate manufacturer's public key for each manufacturer's product (e.g., for each FCC ID number) or group of products. Such an arrangement would protect against compromise of the manufacturer's private key. It should be noted that the TVBD itself should not provide the reference to the public key, as the verifier of the certificate should independently obtain the public key of the certificate signer, in order to avoid imposters referencing false keys.

To protect against cloned certificates or rogue managers, the certificate contains information that may be used to authenticate the TVBD and the database manager. The certificate includes a field that contains a TVBD unique communications key encrypted by the public key of the database manager. This encrypted field may also optionally contain additional private information such as a reference to the TVBD's account. When registering or querying the database, the TVBD presents its certificate to the database manager.

On receipt of the certificate, the database manager, or any other recipient of the certificate, may initially verify the certificate using the public key of the manufacturer to decrypt the certificate. The database manager may also verify a checksum and confirm that the FCC ID and device identification match the database. If a match is found, the database manager considers the TVBD to be legitimate. The database manager also decrypts the TVBD unique communications key field using its private key to obtain the TVBD unique communications key. The database manager then uses this TVBD unique communications key to encrypt messages to the device using a cryptographic process (e.g., Advanced Encryption Standard (AES)) that is supported by the device.

The encrypted message from the database manager may be decrypted by the TVBD using its copy of the TVBD unique communications key and its inherent cryptographic process (e.g., AES) which it has as part of its apparatus to encrypt traffic for its user's communications. The algorithms supported by the TVBD are reported as part of the certificate so that the database manager knows which cryptographic process to use (e.g., a "cipher type" field encrypted by the manager's public key). In some situations, the database manager and the TVBD may use the communications key to establish a new session key that is used for this communication session or that is stored and used for future communications.

Figure 2:
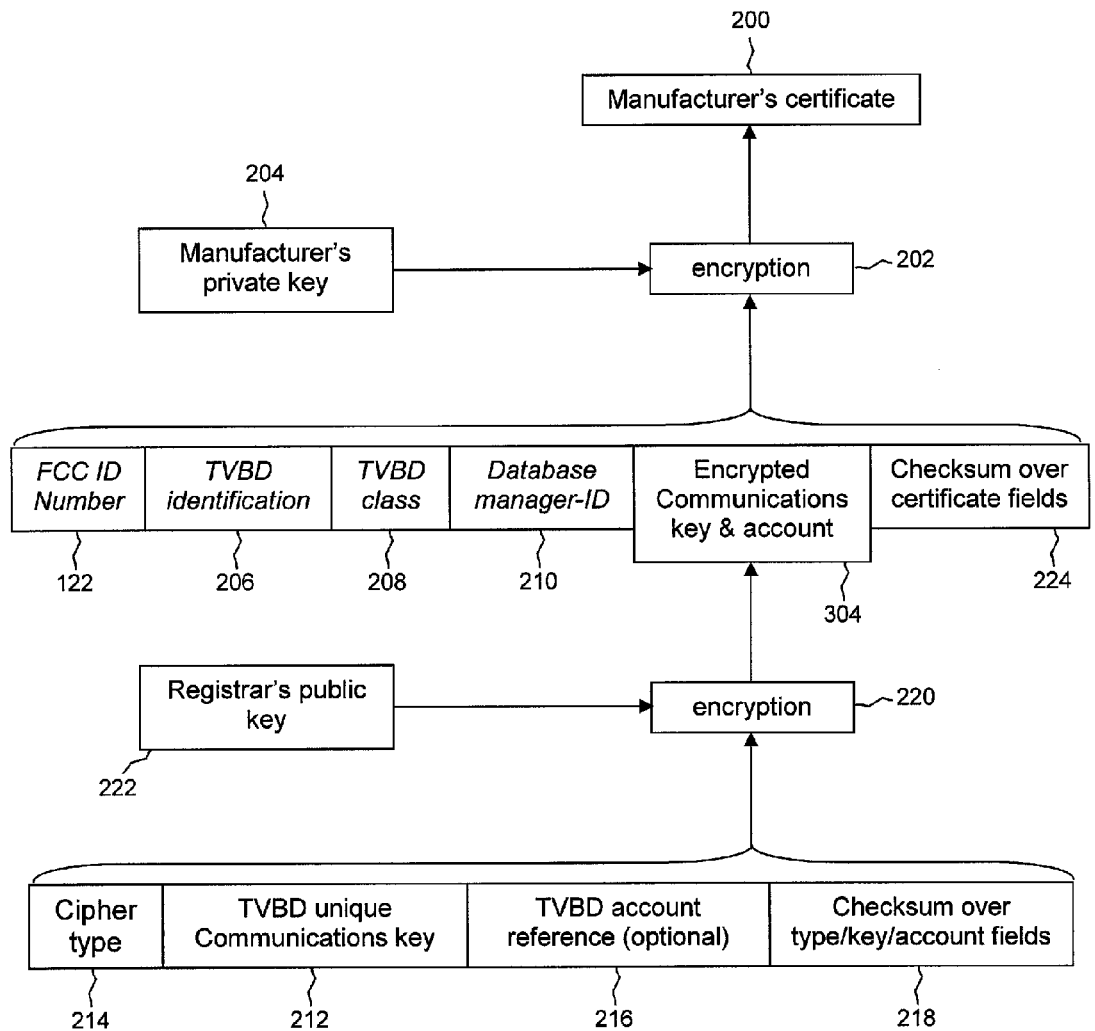
FIG. 2 illustrates a structure and creation of an encrypted manufacturer's certificate for a TVBD, according to an embodiment of the disclosure.

An embodiment of a general structure of a manufacturer's certificate is illustrated in FIG. 2. A manufacturer's certificate 200 is created through an encryption 202 of information fields by a manufacturer's private key 204. A registration or inquiry message sent to the database manager includes this certificate 200 together with other device information (e.g., the FCC ID number 122, TVBD identification number 206, TVBD class 208, and database manager ID 210).

Figure 3:
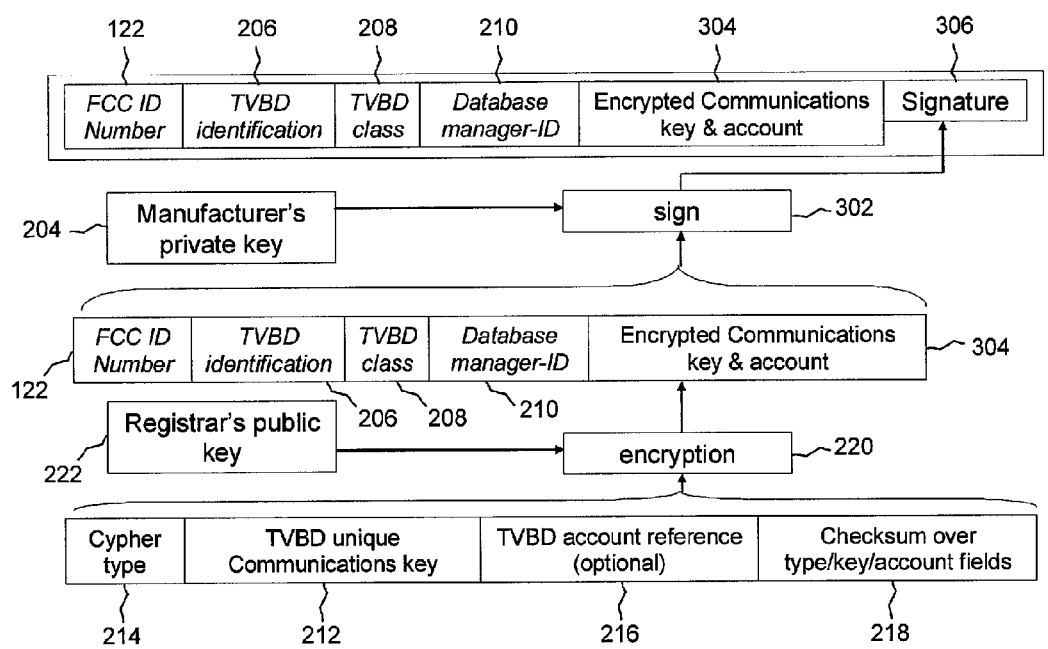
FIG. 3 illustrates a structure and creation of a signed manufacturer's certificate for a TVBD, according to an embodiment of the disclosure.

An alternative embodiment wherein a certificate uses a signing procedure is illustrated in FIG. 3. In this configuration, the manufacturer's key 204 is used to "sign" 302 the device's information (e.g., FCC ID number 122, TVBD identification number 206, TVBD class 208, database manager ID 210, and encrypted communications key and account 304). There are several standard procedures for such signatures, any of which may be suitable for the present embodiments. Typically, a signature 306 is created by using the manufacturer's private key 204 to encrypt a field created by a hash of the device information. The certificate of FIG. 3 has a length that is shorter than the device information, whereas the certificate 200 of FIG. 2 is of substantially the same length as the device information.

The message of FIG. 3 that is sent to the database manager includes the signed certificate together with other device information (e.g., FCC ID number 122, TVBD serial number 206, TVBD class 208, database manager ID 210, and encrypted communications key and account 304) as shown in the top line of the figure. This configuration has the advantage that the communications message is significantly shorter in length (e.g., about two-thirds) compared to the fully encrypted technique. It also has the advantage that checksum fields are not needed within the certificate, as the encryption of the message hash provides protection against transmission errors and ensures application of the correct key.

With these features, the TVBD and the database manager are protected against cloned or copied certificates and the TVBD is assured it is communicating with an authorized database. Cloned certificates are prevented, as a clone certificate cannot be created unless the "cloner" knows the manufacturer's private key. Only the manufacturer can make a certificate. The certificates are calculated at the factory and installed in the devices, so there is no need for the TVBD to be able to do public key cryptographic processes or know the private key of the manufacturer. A rogue device cannot use a legitimate device's certificate because it will not know the unique communications key that is hidden in the certificate and that can only be decrypted by the intended database manager.

In FIGS. 2 and 3, the certificate 200 and the signature 306 are shown being created using a "private" key 204 of the manufacturer. In an embodiment, these private keys 204 are one half of an asymmetric private/public key pair. In these configurations, often referred to as public key cryptography, the encryption is performed using the private key 204, which is known only to the manufacturer, but the decryption is performed using the public key, which is publicly known. This process establishes that the certificate was created by the manufacturer, which is the only entity that knows the private key 204.

The method of certificate creation disclosed herein is equally valid using "symmetric private" keys. In this configuration, the certificate is encrypted using a private key that is only known to the manufacturer and the database manager. These keys have the advantage that the encryption process is often less expensive to perform, but have the disadvantage that the certificate can only be verified by a holder of the manufacturer's private key. Also, as the key is known by both the manufacturer and the database manager, this technique is more vulnerable to compromise.

As used herein, the term "key" might refer to either part of a private/public key pair, both parts of a private/public key pair in combination, either of the sender's or the receiver's key of a private/private (symmetric) key system or both of the sender's and the receiver's keys. For example, if public key cryptography is used, a private key might be used for encryption and a public key might be used for decryption, or vice versa. In that case, the term "key" as used herein might refer to the private key, the public key, or the combination of the private and public keys. If private key (symmetric) cryptography is used, a private key is used for both encryption and decryption. In that case, the term "key" as used herein might refer to one of the private keys or to both the private keys.

To create the certificate 200 to be installed in the device, the manufacturer selects a unique communications key 212. This is typically an integer number that is of suitable length (e.g., 512 bits) for the cipher type 214 supported by the TVBD (e.g., AES). The manufacturer may also optionally include additional information such as an account number 216 (or a reference to an account number) to be used for accounting. The account number 216 may be used, for example, by the database manager to account for access fees and to select the services and features contracted for the device. A checksum field 218 may also be provided to enable the receiver to verify if it has correctly decrypted the communications and account field of the certificate.

The checksum 218 may be created using any suitable method, such as simple summation or a hash function of the elements of the certificate. As discussed below, the checksums 218 are provided to enable the receiving entity to quickly determine if the correct key 212 has been used for decryption and hence confirm that the key 212 and account information 216 have been correctly decoded. The length of the key 212 may vary by TVBD, region or country, and the cipher type field 214 may contain information about the key length in addition to the cipher type. In some implementations, the cipher type, key length or checksum process may be implied by the manufacturer's identity and identification number. That is, this information may be predefined for all devices having the same manufacturer's FCC ID number. However, it may be preferable for these items to be coded as part of the cipher type field 214 so that they may be changed if new processes or operational needs require.

The combination of cipher type 214, TVBD unique communications key 212, account reference 216 (if provided), and checksum 218 is then encrypted 220 using a registrar's/manager's public key 222. This encrypted sequence becomes a field 304 in the certificate. The certificate is then assembled using the FCC ID number 122, the device's identification number 206, the TVBD class 208, the database manager ID 210, the encrypted communications key 304, and, in the case of FIG. 2, the checksum 224. The checksum 224 may be created using any suitable method (e.g., simple summation or a hash function of the elements of the certificate 200) and is provided as part of the certificate 200 so that the receiver can easily determine if the certificate 200 has been successfully decrypted. The TVBD class 208 indicates the class of TVBD as outlined by the regulator (e.g., the FCC).

In the case of FIG. 3, the combination of FCC ID number 122, identification number 206, TVBD class 208, encrypted communications key 304, and checksum 224 is then authenticated or "signed" 302 using the manufacturer's private key 204. This authenticated sequence becomes the manufacturer's certificate that is installed in the TVBD at time of manufacture (e.g., recorded in a TVBD manufacturer's certificate store 404, as will be described with regard to FIG. 4). The manufacturer also installs in the device the TVBD unique communications key 212 (e.g., this key 212 is recorded in a TVBD controller's protected store 406, as will be described with regard to FIG. 4).

The database manager ID 210 may be used to support operation of multiple database managers. In one alternative, the database manager ID 210 may indicate the identification of the registrar/manager who holds the private key corresponding to the public key (registrar's public key 222) used to encrypt the TVBD unique communications key 212 and the account number 216. In an embodiment, each of the registrars/database managers has their own unique public/private key pair. At the time of TVBD manufacture, the manufacturer makes commercial arrangements with a database manager and installs in the TVBD a manufacturer's certificate 200 coded with the database manager ID 210 and using that registrar/manager's public key 222.

The TVBD could also be configured with the address 426 of the registrar/manager, as will be described with regard to FIG. 4. At the time of registration or database inquiry, the messages could be sent to the manager's address 426 and could be decipherable by the receiving manager. In an embodiment, the address 426, while unique, is that of a proxy service that could redirect the message to the appropriate registrar/database manager in the event of a change in business relations after the time of manufacture.

In other embodiments, the registration/database queries could be sent to any registrar/database manager, which might then forward the message to the appropriate registrar/manager based on the database manager ID 210 included in the manufacturer's certificate 200.

While it may be possible to operate multiple database managers by having them all use the same public/private key pair, this may be undesirable, as the compromise of the common private key could compromise all TVBDs and all managers. In embodiments where there may be multiple jurisdictions, such as across international boundaries, the TVBD may be fitted with multiple manufacturer's certificates that may be used within each jurisdiction. The device may use knowledge of its location to choose which certificate and address to use to contact the appropriate registrar/database manager for the TVBD's location. Alternatively, the TVBD may inquire of a local registrar/manager as to which certificate it should submit.

In the event of a change of business arrangements between the manufacturer and the database manager that occurs after the manufacture of the TVBD and the installation of a certificate pointing to the database manager, the new database manager, acting as an agent for the original manager, may install a new certificate and communications key in the TVBD that will direct future inquiries to the new database manager. The new certificate and keys may be installed on an individual device basis or based on product type or other grouping of devices. The new certificate may be installed at any time. For example, devices registering after a change of ownership can have their new certificate installed as part of the database manager registration process At the time of registration or for TVWS database inquiries, the certificate is sent (together with the device's FCC ID, identification number and database manager ID) by the TVBD to the registrar or database manager to establish the TVBD's authenticity. The TVBD's location and commercial information (e.g., names of owner and contact person) is encrypted using the TVBD's unique communications key 212 as shown in FIGS. 2 and 3. The validity of the certificate 200 may be confirmed by decrypting the certificate 200, as in FIG. 2, or by verifying the signature 306, as in FIG. 3, using the manufacturer's public key. The database manager determines the public key needed to verify the certificate 200 or signature 306 by using the device's FCC ID number 122 to point to the manufacturer and the relevant public key.

The correct decryption of the certificate 200 may be determined by the receiver if the checksum 224 is correct after decryption and the FCC ID number 122 and TVBD identification number 206 match those sent by the TVBD, as in FIG. 2, or if the signature 306 is verified, as in FIG. 3. If the FCC ID number 122 and TVBD identification number 206 do not match, the certificate 200 may be presumed by the receiver (i.e., the database manager or the registrar) to be invalid. Alternatively, there may have been an error in transmission. The registrar or the database manager may then request the TVBD to resend the request and certificate 200.

If the certificate 200 is shown to be valid, then the registrar or database manager may recover the encrypted communications key 212 and account information 216 by decrypting those fields using the registrar's private key. If the checksum 224 after this decryption is valid, the fields can be presumed to be valid. If the checksum 224 does not match, then the certificate 200 may be invalid or there may have been an error in transmission, and the registrar or the database manager may request the TVBD to resend the request and certificate 200. The use of the checksum 224 in this way is not necessarily required, but it provides a quick and convenient way to verify that the correct key 212 has been used and the decryption has been successful.

If the certificate 200 has been verified and the communications key 212 recovered, the registrar may use the communications key 212 to decrypt other fields in the message indicating the device's coarse location. For example, the most significant digits of the location may be decrypted. The registrar may put this information in its repository of registered TVBDs. At this point, the authenticity of the TVBD is not fully established, as a previously overheard registration message could be replayed by another (rogue) TVBD. However, a device replaying a registration message will not have the real device's unique communications key 212 and so will not be able to make use of channel or other information sent by the manager in response to the registration or inquiry. By this method, the effect of a replay attack is limited to a spurious registration or database inquiry. As noted below, the device's coordinates are encrypted by the device's unique communications key 212, and so a rogue device replaying a query or registration message is not able to obtain a database response for its location, as the rogue device is unable to submit its coordinates as part of the replayed inquiry.

Once the TVBD is registered, the registrar may send a message to the TVBD confirming the successful registration. This message to the TVBD is encrypted using the cipher type 214 indicated in the decrypted certificate field and the TVBD unique communications key 212. This message may include information that the TVBD has been registered and, if requested, a list of the available channels for the TVBD's location.

If the TVBD receives a response from the registrar and is successfully able to decrypt it using its communications key 212, it knows that it has been registered with a legitimate database and it may be informed of available TVWS channels.

Figure 4:
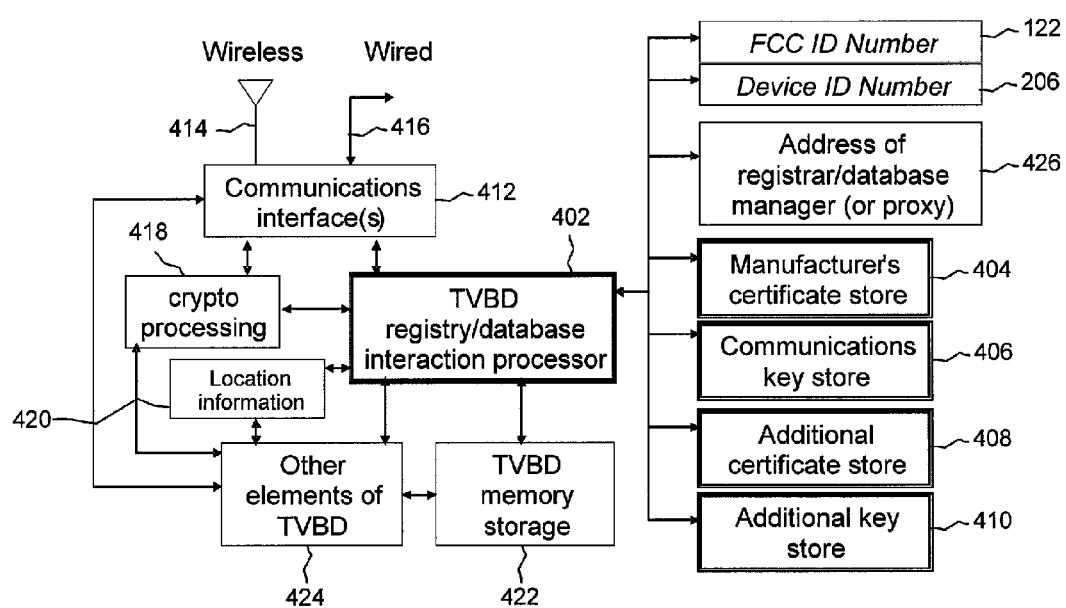
FIG. 4 illustrates an apparatus in a TVBD for registrar/database authentication/security, according to an embodiment of the disclosure.

FIG. 4 illustrates components that might be present in a TVBD such that the TVBD can carry out the embodiments described herein. Components that might be included in the TVBD include a TVBD registry/database interaction processor 402, a storage area 404 for the manufacturer's certificate, and a communications key store 406. Optionally, additional certificates and/or keys may be stored in an additional certificate store 408 and/or an additional key store 410 by the manufacturer or registrar/database manager. These elements may be in addition to the previously existing communications interface(s) 412, associated antennas 414 for wireless connections, wired connections 416, cryptographic processing apparatus 418, location information 420, TVBD memory storage 422, and other elements 424 of the TVBD. The TVBD also stores its FCC ID number 122, its identification number 206, and an address 426 or proxy for the registrar/database manager.

In some embodiments, the manufacturer's certificate store 404, communications key store 406, additional certificate store 408, and additional key store 410 may be part of the general TVBD memory storage 422 that is permanent with the TVBD. Similarly, the TVBD registry/database interaction processor 402 may be a set of functions implemented on the control processor that otherwise operates the TVBD (e.g., application program code running on the TVBD's control processor). The TVBD registry/database interaction processor 402 can connect to the communications interface 412, the TVBD memory 422, the cryptographic processing apparatus 418, and other elements 424 of the TVBD. The TVBD registry/database interaction processor 402 retrieves the manufacturer's certificate to become part of the messages sent to the registrar/database manager. The TVBD registry/database interaction processor 402 also retrieves the communications key from the store 406 and uses it together with the cryptographic processing element 418 to encrypt and decrypt message content sent to and from the registrar/database manager over the communications interface 412. The TVBD registry/database interaction processor 402 also retrieves the FCC ID number 122, the identification number 206, and the address 426 of the registrar/database manager to become part of the message contents. The TVBD registry/database interaction processor 402 may also receive additional certificates, keys, and/or updates which it verifies and stores in the additional certificate store 408 and/or additional key store 410 for use in later communications. The TVBD registry/database interaction processor 402 may also retrieve location information 420 from other elements of the TVBD and encrypt these using the communications key and the cryptographic processor 418 for communication to the registrar/database manager. The TVBD registry/database interaction processor 402 also receives messages from the database manager, decrypts them using the communications key and, if they contain TVWS channel assignments, informs the other elements of the TVBD of the allowed channels.

Some TVBD users may be concerned about information that is required by the FCC, such as device, owner, and location information, becoming part of a large database operated by another entity. As this information only needs to be visible when there is an interference problem to be resolved by the regulator, it may be preferable for the information to be encrypted such that only the regulator (e.g., the FCC or their designate) may unlock the information. As discussed briefly above, a degree of privacy may be achieved by using the TVBD's communications key to encrypt the TVBD's location coordinates and the registration information. This protects the knowledge of the TVBD's location and commercial information from eavesdroppers on the communications path, and the encryption assures the TVBD that only the authorized registrar database manager can receive the TVBD's location information as it is protected by the registrar's private key and the TVBD communications key. However, some users may be apprehensive of there being a database manager that maintains a database of all the location and ownership information of all of the devices, as this may be considered sensitive commercial information. Indeed, in some jurisdictions, there are legal requirements to protect privacy and prevent the misuse of this information.

In an embodiment, to protect the privacy of the registration and location information, the manufacturer can install a regulator's certificate in the device that is similar to the manufacturer's certificate described previously. The regulator's certificate can be used to verify the identity of the TVBD to the regulator (FCC) and to pass a regulator communications key to the regulator so that the regulator may decrypt the TVBD location and commercial information.

The full TVBD location information can be made available to the FCC but kept inaccessible to the database manager by dividing the location information into two portions. For TVWS channel assignments, the resolution needed for the TVBD's location may be limited to several hundreds of meters, while the TV coverage region may be many tens of kilometers in extent. In an embodiment, the privacy of the TVBD's location is maintained by using the most significant portions of the TVBD's location coordinates to access the location/channel database. The least significant digits of the location information ("location fine part"), for example, is encrypted with an encryption key accessible only by the regulator (e.g., the FCC) using a TVBD unique regulator communications key. In other words, the coarse location of the TVBD is encrypted using only the database manager public key, but the more detailed location of the TVBD within the general location is encrypted using the regulator communications key. The database manager would only see the coarse location, while the database repository would contain an encrypted version of the detailed location protected by the regulator communications key.

The registration information required by the FCC may also be encrypted using the regulator communications key. The detailed location and the commercial ownership details may be stored in the database together with the regulator's certificate provided by the device, but would not be readable by the database managers due to the encryption. However, if there is an interference problem, the (encrypted) detailed locations of all the devices in the general area of concern, together with their regulator's certificates, are communicated to the regulator (or the regulator's designated agent), which may decrypt that information (using the regulator's private key to obtain the TVBD's regulator communications key), determine the exact location, and use the ownership and registration information to resolve the problem.

Figure 5:
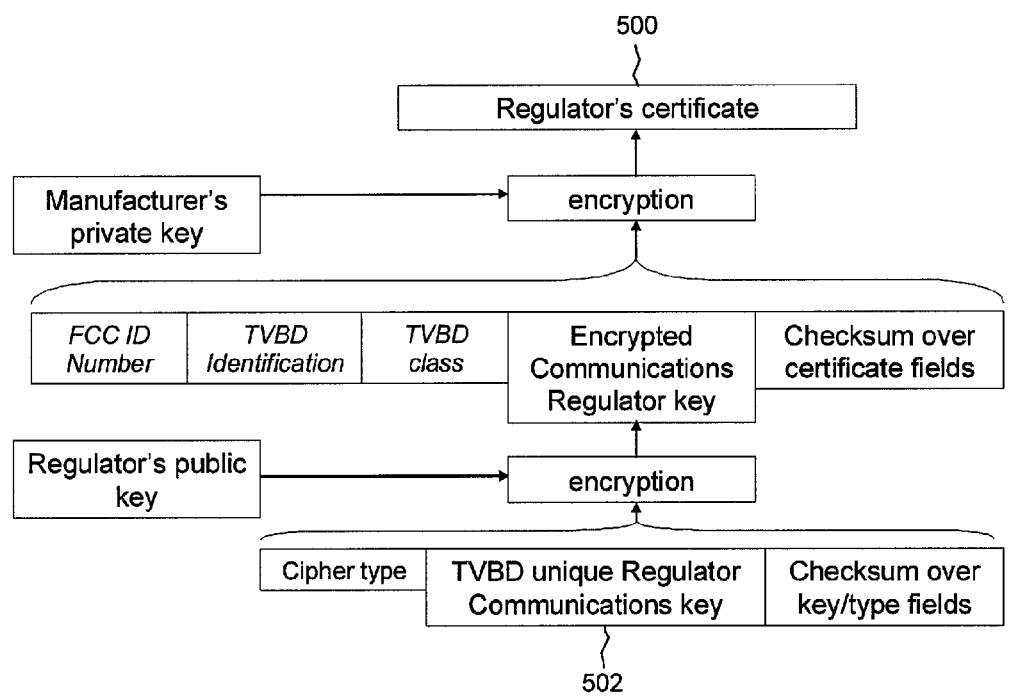
FIG. 5 illustrates a structure of a regulator's certificate in an encrypted form, according to an embodiment of the disclosure.

An embodiment of a regulator's certificate is illustrated in FIG. 5. Using the certificate 500, the regulator may access the protected information in the database for an individual TVBD. In an embodiment, when there is an interference issue (or other requirement), the database manager sends the regulator's certificate 500 together with other device database information to the regulator. The regulator can then verify the certificate 500 by decrypting using the manufacturer's public key. The regulator may then decrypt (using the regulator's private key) the TVBD's unique regulator communications key 502. The TVBD unique regulator communications key 502 can then be used to decrypt the detailed location information for the TVBD and the commercial information. The detailed information may be used to help resolve interference or other operational issues.

The configuration of FIG. 5 illustrates a certificate 500 that is formed by encrypting the information of the device and that is similar to the certificate 200 of FIG. 2. An alternative configuration using a signature procedure similar to that of FIG. 3 may also be used to shorten the message and storage requirements for the regulator's certificate 500.

In this embodiment, at the time of registration or database inquiry, the TVBD sends its regulator's certificate 500 in addition to its manufacturer's certificate discussed above. The commercial information is encrypted with the TVBD unique communications key and is also sent to the registrar/database manager. The location information is sent in two parts. The most significant portion of the location is sent encrypted only with the TVBD unique communications key, while the least significant portion is encrypted also with the TVBD unique regulator's communications key 502. (It may be bad practice to send the complete location information encrypted and the coarse information unencrypted as this would expose the information to a partial plain text attack.) The regulator's certificate 500 and the associated location information are sent to the database manager encrypted by the TVBD unique communications key, so that even the coarse location information about the device is protected against eavesdropping on the communications channels.

Figure 6:
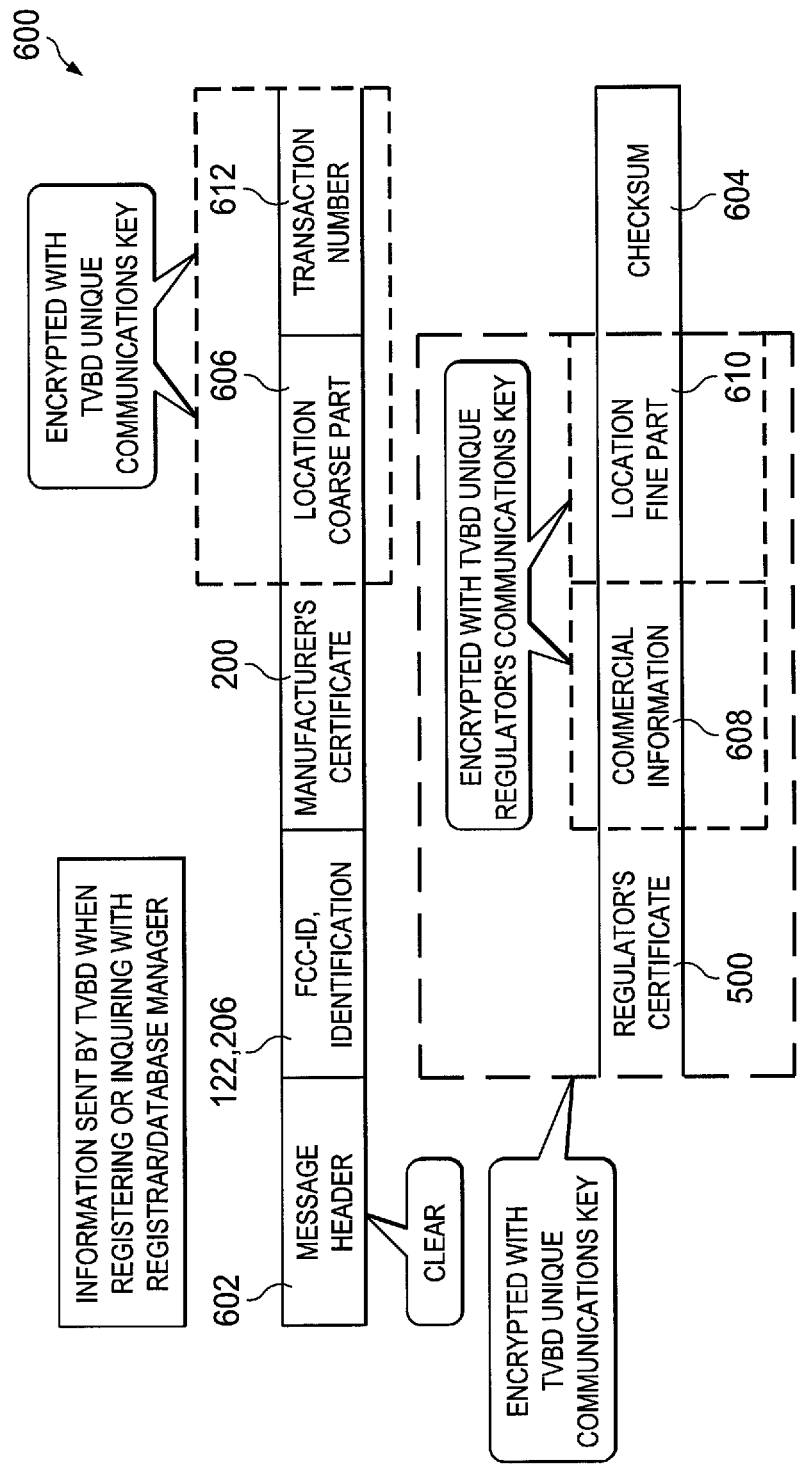
FIG. 6 illustrates information sent to a registrar/manager for a registration or a query with privacy, according to an embodiment of the disclosure.

FIG. 6 illustrates an embodiment of a structure of the information sent to the registrar/manager for registration or database query. The message 600 includes a message header 602 and a checksum 604 and such other overhead that may be appropriate for the communications protocol (e.g., Point to Point Protocol (PPP)). The message 600 also includes the TVBD's FCC ID 122 and identification number 206 and the manufacturer's certificate 200. The present embodiments do not call for encryption to be applied to these elements, but other link encryptions (e.g., TLS) unrelated to these embodiments may be applied to the message 600. The message 600 also includes a TVBD location coarse part 606, the TVBD's regulator's certificate 500, commercial information 608, and a location fine part 610. The commercial information 608 and the fine part 610 of the location are encrypted using the TVBD's regulator's communications key. The TVBD location coarse part 606, TVBD's regulator's certificate 500, commercial information 608, and location fine part 610 are encrypted by the TVBD unique communications key. As discussed above, the registrar/manager may decrypt the location part to determine the availability of TVWS channels. The message information, including the identification information 122 and 206, manufacturer's certificate 200, regulator's certificate 500, and encrypted location information and commercial information 608 are stored as records in the repository. As discussed below, the manager may also store the network address (e.g., IP address) of the TVBD to permit future communications with the TVBD.

The message 600 may also include an optional transaction number 612 encrypted with the TVBD unique communications key. In some embodiments, this number 612 may be incremented for each communications transaction in order to protect against "replay attacks" on the communications system. (In a replay attack, a rogue device in the network "replays" a previously heard message to the recipient. Sometimes this replay will have an altered header and return address to try to fool the recipient into responding to the rogue device with information. Sometimes the replay is a variant of the "denial of service attack" as it floods the recipient with what look like valid queries.) The inclusion of a transaction counter helps the recipient quickly discard invalid messages. That is, the database manager expects to see an increasing number in this field for each valid message sent by the TVBD.

In some configurations, this counter 612 may also be used to distinguish an initial registration message from a channel query message. The first message (with a first transaction number) would be the initial registration of the device with the database. Later messages with other transaction numbers would be database queries. For these later messages, the database manager need not update its repository with information about fixed devices as the device has already been registered.

Figure 7:
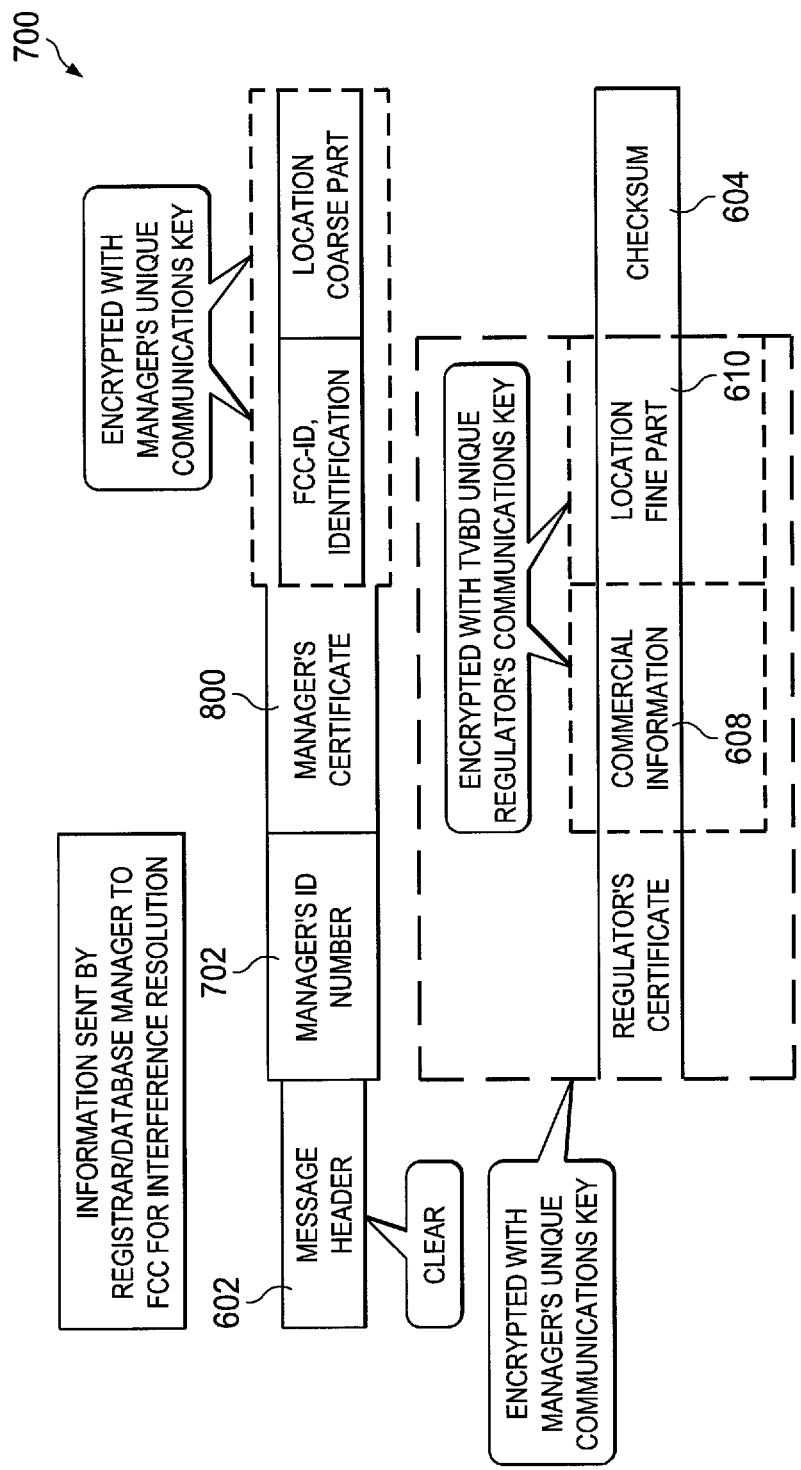
FIG. 7 illustrates information sent to the FCC for interference resolution, according to an embodiment of the disclosure.

In an embodiment, if resolution of interference is required, the registrar/database manager sends to the regulator all of the records for devices in the neighborhood of the suspect location. Such a message 700 is illustrated in FIG. 7. This message 700 has a similar structure to the registration message 600 of FIG. 6, with a message header 602 and checksum 604 appropriate to the communications protocol being used (e.g., PPP). The message contents include a manager's ID 702, a manager's certificate 800 (which will be described with regard to FIG. 8), and information about the device (or devices) being reported from the registration repository. In these messages 700, the information about the TVBD is encrypted using the manager's unique communications key, with the commercial information 608 and detailed location 610 also further encrypted by the TVBD's unique regulator communications key. In this and other messages, additional fields may be included that are not described in this disclosure.

Figure 8:
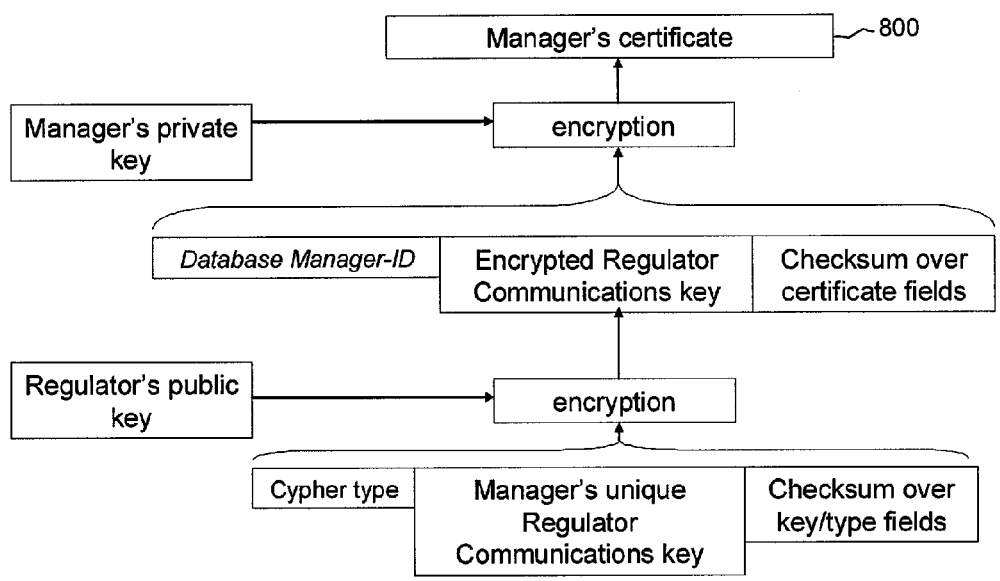
FIG. 8 illustrates a structure of a manager's encrypted certificate, according to an embodiment of the disclosure.

FIG. 8 illustrates an embodiment of the manager's certificate 800, which is of similar structure to the manufacturer's certificate 200 and the regulator's certificate 500 of FIGS. 2 and 5, respectively. The configuration of FIG. 8 illustrates a certificate 800 that is formed by encrypting the information of the device and that is similar to the certificate 200 of FIG. 2. An alternative configuration using a signature procedure similar to that of FIG. 3 may also be used to shorten the message and storage requirements for the manager's certificate 800.

With this method of database query, the location information and commercial information can be protected against disclosure to the database manager, and yet the information can be made available when needed for interference resolution by the regulator. Users may thus take advantage of operating in the TVWS channels without concern that their commercial interests may be compromised through the interaction with the database.

In some jurisdictions (e.g. EU) the regulator or the network operators may require that the devices always comply with regulations even when operation may require information from an external database. Such operation may include usage of licensed channels in an operator's domain, or a combination of licensed or unlicensed channels in multiple domains. The embodiments outlined here enable the devices to inquire of an external data base and receive operating information in a manner that is secure and ensures that the information received is from an authorized database. The embodiments thus enable the device to comply with regulations by operating only with information from authorized databases.

In some instances, the regulator may require that all devices of a certain type (e.g., with a designated FCC ID number and identification number range) be forbidden from using TVWS channels. This may occur due to the devices being involved in interference situations. This scenario is easily accommodated by the methods and apparatus of the present embodiments. To disable a TVBD, the registrar/database manager can send a message to the TVBD, encrypted with the device's unique communications key, indicating that there are no TVWS channels available for use. On receipt of the message, the TVBD will decrypt the message verifying that it is from the authorized database manager. As there are no channels indicated to be available, the TVBD will stop its operation in the TVWS channels. This restriction message may be sent either in response to the TVBD making a channel inquiry (e.g., as part of its periodic 24 hour inquiry), or as a directed message to the TVBD. Note that to send a message to the TVBD, the database manager needs to know the address for the TVBD (e.g., the IP address). It will know this when the TVBD inquires for the periodic 24 hour update or makes some other request. For intervening directed messages to the TVBD, the database manager may also record the network address of the TVBD from its most recent inquiry. On receipt of the message indicating that there are no channels available, the TVBD will stop its operation in the TVWS channels.

Figure 9:
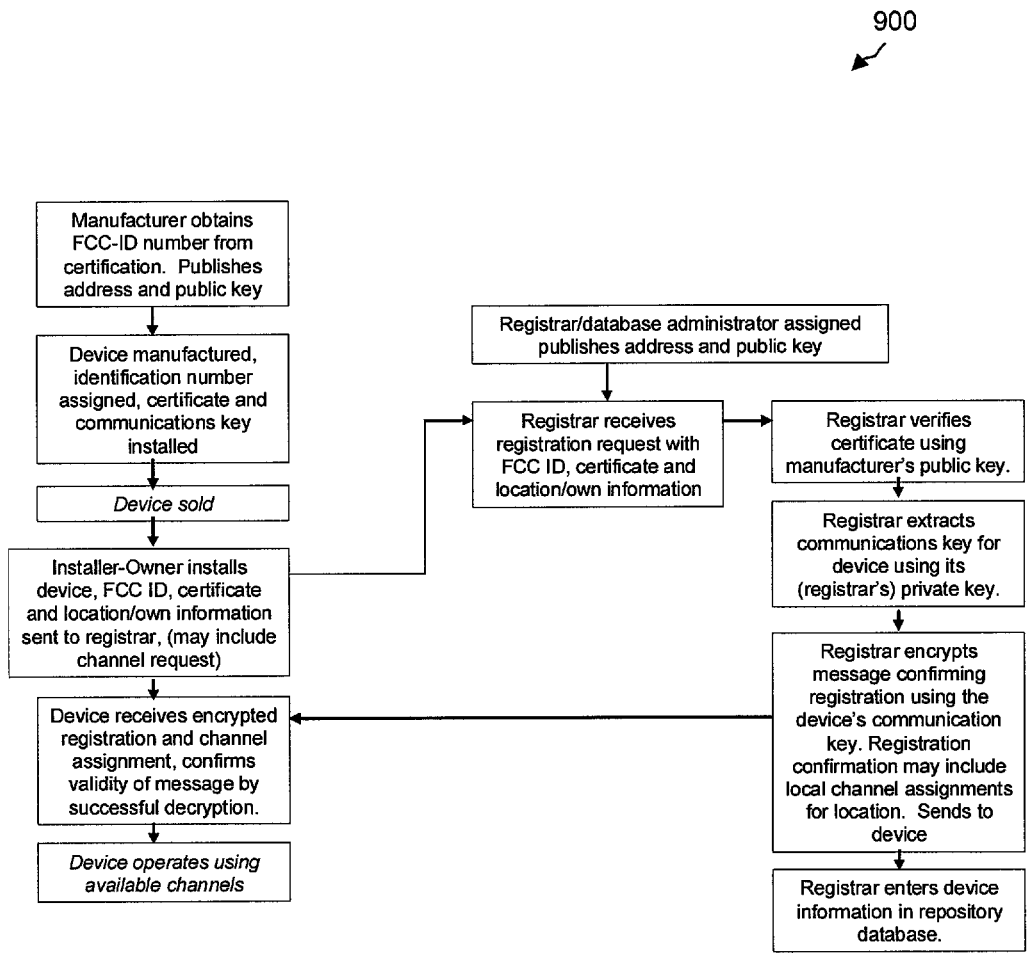
FIG. 9 illustrates an exchange of information between a TVBD and a registrar/database manager, according to an embodiment of the disclosure.

FIG. 9 is a diagram illustrating an embodiment 900 of a sequence of events for a method of operation for a device and a registrar/database to mutually authenticate one another and for the registrar/database to provide a channel assignment to the device. This method makes use of messages exchanged among the TVBD, the database manager, and the registrar. These messages may be exchanged using any standard method. The EAP, for example, may be used to transport the identification and certificates between the TVBD and the registrar/database manager. The general EAP-TLS, for example, may be extended to include signaling support for the method of certificate exchange and verification used in this method. It should be noted that the present embodiments differ from the defined EAP-TLS in that this method does not require the TVBD to maintain the private key associated with the client certificate, and hence is more secure, less computationally intensive, and of lower cost.

With the present embodiments, the TVBD is also not required to know about or be able to perform the cryptographic function required to use the private key associated with the certificate. Procedures such as forms of Transport Layer Security (TLS) may, for example, be used with these embodiments to establish a secured communications channel between the TVBD and the registrar/database manager and through which the messages of these embodiments may be exchanged. However, one of the advantages of these embodiments is that such a secure channel is not needed to attain the value described herein. This is a significant security advantage and cost saving.

It may be preferable for the manufacturer's certificate that is installed in the device to be unique for each TVBD. Hence, it may be preferable for the TVBD communications key to be a unique (e.g., random) field that is unique for each TVBD. While the uniqueness of the certificate could be achieved through the use of a manufacturer's counter or a unique device serial number, this may not be a desirable choice, as these numbers may be predictable from the device ID and identification number and so may enable a "known-plain-text attack" on the certificate to recover the manufacturer's private key and so enable generating clone certificates.

Figure 10:
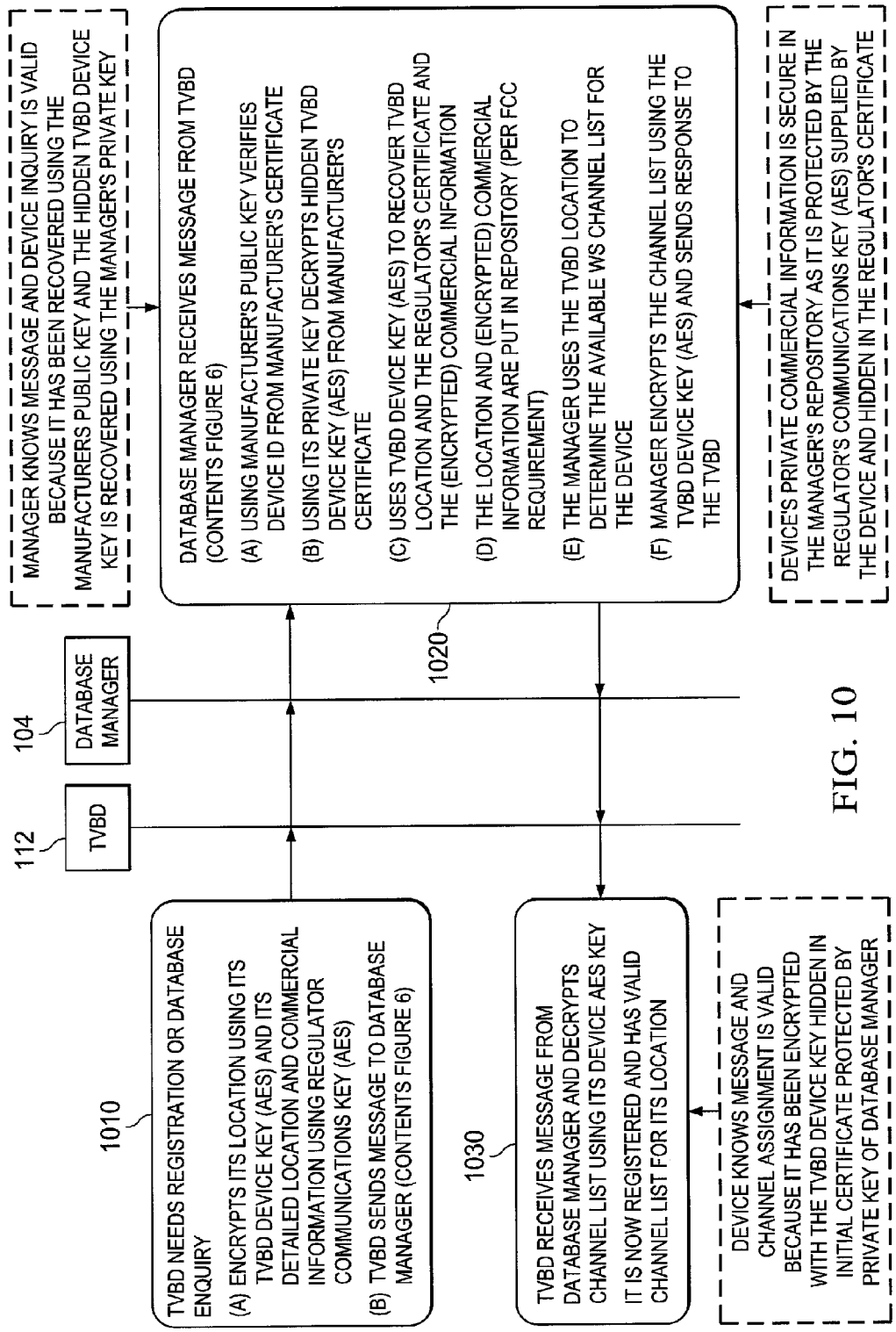
FIG. 10 illustrates messages exchanged between a TVBD and a database manager, according to an embodiment of the disclosure.

FIG. 10 illustrates a summary of an embodiment of an authenticated flow of messages from the TVBD 112 to the database manager 104 and the response of the database manager 104 to establish registration or to provide channel information to the TVBD 112. In this embodiment, at block 1010, the TVBD 112 makes a registration or channel availability inquiry by formulating a message, such as that of FIG. 6, using the manufacturer's certificate and its encrypted location/commercial information. More specifically, the TVBD 112 encrypts its location using its TVBD device key and its detailed location and commercial information using the regulator communications key. The TVBD 112 then sends that message to the database manager 104 using the communications network and a suitable message protocol established between them.

The database manager 104, at block 1020, receives the message from the TVBD 112 and, using its manufacturer's public key, verifies the device ID from the manufacturer's certificate. Using its private key, the database manager 104 then decrypts the hidden TVBD device key from the manufacturer's certificate. The database manager 104 knows that the message and device inquiry are valid because they have been recovered using the manufacturer's public key. The database manager 104 then uses the TVBD device key to recover the TVBD location, the regulator's certificate, and the encrypted commercial information. The database manager 104 then stores the location information and encrypted commercial information in its repository. The TVBD's private commercial information is secure in the database managers' repository as it is protected by the regulator's communications key supplied by the TVBD 112 and hidden in the regulator's certificate. The database manager 104 uses the TVBD location to determine the available white space channel list for the TVBD 112. The database manager 104 then uses the TVBD device key to encrypt the channel availability information. The database manager 104 then sends the encrypted channel availability information in a message to the TVBD 112.

The TVBD 112, at block 1030, receives the message from the database manager 104 and decrypts the channel list using its device key. The TVBD 112 is now registered and has a valid channel list for its location. The TVBD 112 knows that the message and the channel assignment are valid because that information has been encrypted with the TVBD device key hidden in the initial certificate.

The same process of verification may be used for both registration and database inquiries, but in some implementations the TVBD may make use of a registration certificate that is issued by the registrar for database access. This registration certificate could have the same information structure as the manufacturer's certificate, but could include a new unique communications key and could be used by the TVBD when inquiring of the database for channel assignment updates.

The device and the database manager could use the same mechanism to establish a new certificate for the TVBD (this may result, for example, in there being separate certificates for manufacturer and the database manager or for each of a multiplicity of managers). In one scenario, the registrar/database manager may assign a new certificate and communications key to the TVBD at registration time. The TVBD would then use this new certificate-key pair for its queries to the database manager to inquire of TVWS channels. This new certificate and communications key would be communicated to the TVBD encrypted using the TVBD's unique communications key.

The present embodiments minimize the number of messages exchanged among TVBDs and database managers. Most registrations and inquiries can be completed with one message from the TVBD to the manager and one response from the manager to the TVBD. This minimizes database operational costs and costs of communications across the network. An alternative of establishing a new session key for communications would likely be used only when it is desired to change the communications key for security concerns or longer information exchanges such as database updates.

The embodiments disclosed herein can eliminate the need for a database manager to maintain a list of keys for a large number of devices, since each device reports its certificate with each query, and the certificate contains the necessary unique device communications key. The present embodiments can also eliminate the need for a complex cryptographic process (e.g., public key cryptography) to be performed in the devices. That is, no exponentiation of public keys is required by the TVBD, as the manufacturer's certificate is pre-computed by the manufacturer and installed in the TVBD. There is no need for separate public/private key pairs for each device, as a device can make use of its existing communications process for encryption/decryption of the communications messages with the registrar/database manager. The secret key shared between the TVBD and the manager is communicated through the pre-stored certificate, which contains the pre-stored device key, which itself is encrypted using the manager's public key. The present embodiments also allow the TVBD's location and commercial information to be encrypted and so protected against eavesdropping of the communications channel.

Figure 11:
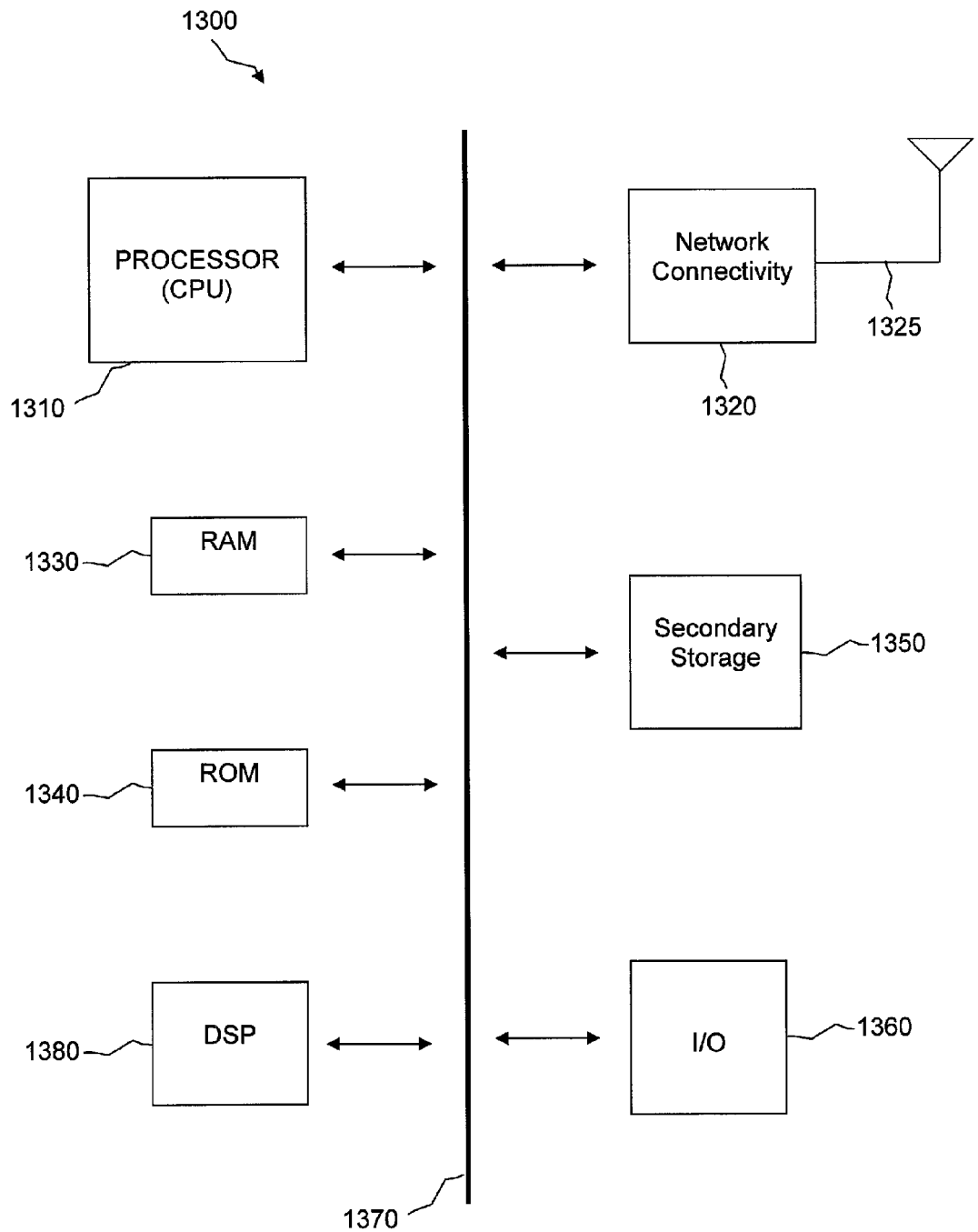
FIG. 11 illustrates a processor and related components suitable for implementing the several embodiments of the present disclosure.

The devices described above might include a processing component that is capable of executing instructions related to the actions described above. FIG. 11 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, digital subscriber line (xDSL) devices, data over cable service interface specification (DOCSIS) modems, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver component 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320.

In an embodiment, a method for a telecommunications device and a database management component to authenticate one another is provided. The method comprises the device sending a first message to the database management component, the first message containing a communications key encrypted using a database management component key, the first message further containing information about the device, the information about the device being encrypted using a manufacturer's key. The method further comprises the database management component decrypting the information about the device using the manufacturer's key. The method further comprises the database management component decrypting the communications key using the database management component key. The method further comprises, when the decrypted information about the device matches information in a database managed by the database management component, the database management component considering the device to be legitimate. The method further comprises the database management component encrypting a second message using the communications key. The method further comprises the database management component sending the second message to the device. The method further comprises, when the device is able to decrypt the second message, the device considering the database management component to be legitimate.

In another embodiment, a database management component is provided. The database management component comprises a processor configured such that the database management component receives information about a telecommunications device, the information about the device being encrypted using a manufacturer's key. The processor is further configured such that the database management component decrypts the information about the device using the manufacturer's key. The processor is further configured such that, when the decrypted information about the device matches information in a database managed by the database management component, the database management component considers the device to be legitimate.

In another embodiment, a telecommunications device is provided. The telecommunications device comprises a processor configured such that the device sends a first message to a database management component, the first message containing a communications key encrypted by a database management component key. The processor is further configured such that the device receives a second message from the database management component, the second message encrypted by the communications key. The processor is further configured such that, when the device is able to decrypt the second message, the device considers the database management component to be legitimate.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for a telecommunications device and a database management component to authenticate one another, the method comprising:
    the device sending a first message to the database management component, the first message containing a communications key encrypted using a database management component key, the first message further containing information about the device, the information about the device being encrypted using a manufacturer's key;
    the database management component decrypting the information about the device using the manufacturer's key;
    the database management component decrypting the communications key using the database management component key;
    when the decrypted information about the device matches information in a database managed by the database management component, the database management component considering the device to be legitimate;

the database management component encrypting a second message using the communications key;

the database management component sending the second message to the device; and when the device is able to decrypt the second message, the device considering the database management component to be legitimate.

2. The method of claim 1, wherein the device is a television band device (TVBD) and the database management component is a television white space (TVWS) database manager.

3. The method of claim 2, wherein the first message is at least one of:

a registration with the TVWS database manager; and an inquiry to the TVWS database manager regarding availability of TVWS channels.

4. The method of claim 3, wherein the second message contains at least one of:

a confirmation of a successful registration; and information regarding availability to the TVBD of at least one TVWS channel.

5. The method of claim 2, wherein private information about the TVBD remains encrypted and unavailable to the TVWS database manager, and wherein the private information is made available to a regulatory agency through the use of a regulator's certificate that is installed in the TVBD at the time of manufacture of the TVBD and that is sent to the TVWS database manager when the TVBD sends one of a registration request and a TVWS channel inquiry to the TVWS database manager and that is stored by the TVWS database manager and sent to the regulatory agency when requested by the regulatory agency.

6. The method of claim 5, wherein the regulator's certificate contains a regulator communications key encrypted by a regulator key, and wherein the regulatory agency uses the regulator key to decrypt the regulator communications key and uses the regulator communications key to decrypt the private information, and wherein the regulator key is unavailable to the TVWS database manager.

7. The method of claim 6, wherein a portion of the private information is detailed location information for the TVBD, and wherein general location information for the TVBD is not encrypted by the regulator key, and wherein the general location refers to a larger geographic area than the detailed location.

8. The method of claim 2, wherein the first message includes a manufacturer's certificate, the manufacturer's certificate including at least one of the communications key, a cipher type, a TVBD account reference, and a checksum encrypted using the database management component key, and the manufacturer's certificate further including the information about the device, the information about the device including at least one of the encrypted communications key, a regulatory agency identification number, a TVBD identification, a TVBD class, a database manager identification, and a checksum encrypted using the manufacturer's key.

9. The method of claim 8, wherein the information about the device is signed using the manufacturer's key to encrypt a field created by a hash of the information about the device.

10. The method of claim 8, wherein the TVBD is provided with a plurality of certificates, each of the plurality of certificates pertaining to a different jurisdiction, and wherein the TVBD determines which of the plurality of certificates to use based on at least one of:

the TVBD's awareness of its location; and an inquiry by the TVBD to a local database regarding which of the plurality of certificates to use.

11. A database management component comprising:

a processor configured such that the database management component receives information about a telecommunications device, the information about the device being encrypted using a manufacture's key, and configured such that the database management component decrypts the information about the device using the manufacturer's key, and configured such that, when the decrypted information about the device matches information in a database managed by the database management component, the database management component considers the device to be legitimate, wherein the database management component receives the information about the device in a first message from the device, the first message further containing a communications key encrypted using a database management component key, and wherein the database management component decrypts the communications key using the database management component key, and wherein the database management encrypts a second message using the communications key, and wherein the database management component sends the second message to the device.

12. The database management component of claim 11, wherein the database management component is a television white space (TVWS) database manager and the device is a television band device (TVBD).

13. The database management component of claim 12, wherein the first message is at least one of:

a registration with the TVWS database manager; and an inquiry to the TVWS database manager regarding availability of TVWS channels.

14. The database management component of claim 13, wherein the second message contains at least one of:

a confirmation of a successful registration; and information regarding availability to the TVBD of at least one TVWS channel.

15. The database management component of claim 12, wherein private information about the TVBD remains encrypted and unavailable to the TVWS database manager, and wherein the private information is made available to a regulatory agency through the use of a regulator's certificate that is installed in the TVBD at the time of manufacture of the TVBD and that is sent to the TVWS database manager when the TVBD sends one of a registration request and a TVWS channel inquiry to the TVWS database manager and that is stored by the TVWS database manager and sent to the regulatory agency when requested by the regulatory agency.

16. The database management component of claim 15, further comprising a manager's certificate which promotes identifying secure communication between the TVWS database manager and the regulatory agency to resolve TVBD interference issues.

17. The database management component of claim 15, wherein the regulator's certificate contains a regulator communications key encrypted by a regulator key, and wherein the regulatory agency uses the regulator key to decrypt the regulator communications key and uses the regulator communications key to decrypt the private information, and wherein the regulator key is unavailable to the TVWS database manager.

18. The database management component of claim 17, wherein a portion of the private information is detailed location information for the TVBD, and wherein general location information for the TVBD is not encrypted by the regulator key, and wherein the general location refers to a larger geographic area than the detailed location.

19. The database management component of claim 12, wherein the first message includes a manufacturer's certificate, the manufacturer's certificate including at least one of the communications key, a cipher type, a TVBD account reference, and a checksum encrypted using the database management component key, and the manufacturer's certificate further including the information about the device, the information about the device including at least one of the encrypted communications key, a regulatory agency identification number, a TVBD identification, a TVBD class, a database manager identification, and a checksum encrypted using the manufacturer's key.

20. The database management component of claim 19, wherein the information about the device is signed using the manufacturer's key to encrypt a field created by a hash of the information about the device.

21. A telecommunications device comprising:
a processor configured such that the device sends a first message to a database management component, the first message containing a communications key encrypted by a database management component key, and configured such that the device receives a second message from the database management component, the second message encrypted by the communications key, and configured such that, when the device is able to decrypt the second message, the device considers the database management component to be legitimate.

22. The device of claim 21, wherein the device includes in the first message information about itself that is encrypted with a manufacturer's key.

23. The device of claim 22, wherein the device is a television band device (TVBD) and the database management component is a television white space (TVWS) database manager.

24. The device of claim 23, wherein the first message is at least one of:
a registration with the TVWS database manager; and
an inquiry to the TVWS database manager regarding availability of TVWS channels.

25. The device of claim 24, wherein the second message contains at least one of:
a confirmation of a successful registration; and
information regarding availability to the TVBD of at least one TVWS channel.

26. The device of claim 23, wherein private information about the TVBD remains encrypted and unavailable to the TVWS database manager, and wherein the private information is made available to a regulatory agency through the use of a regulator's certificate that is installed in the TVBD at the time of manufacture of the TVBD and that is sent to the TVWS database manager when the TVBD sends one of a registration request and a TVWS channel inquiry to the TVWS database manager and that is stored by the TVWS database manager and sent to the regulatory agency when requested by the regulatory agency.

27. The device of claim 26, wherein the regulator's certificate contains a regulator communications key encrypted by a regulator key, and wherein the regulatory agency uses the regulator key to decrypt the regulator communications key and uses the regulator communications key to decrypt the private information, and wherein the regulator key is unavailable to the TVWS database manager.

28. The device of claim 27, wherein a portion of the private information is detailed location information for the TVBD, and wherein general location information for the TVBD is not encrypted by the regulator key, and wherein the general location refers to a larger geographic area than the detailed location.

29. The device of claim 23, wherein the first message includes a manufacturer's certificate, the manufacturer's certificate including at least one of the communications key, a cipher type, a TVBD account reference, and a checksum encrypted using the database management component key, and the manufacturer's certificate further including the information about the device, the information about the device including at least one of the encrypted communications key, a regulatory agency identification number, a TVBD identification, a TVBD class, a database manager identification, and a checksum encrypted using the manufacturer's key.

30. The device of claim 29, wherein the information about the device is signed using the manufacturer's key to encrypt a field created by a hash of the information about the device.

31. The device of claim 29, wherein the TVBD is provided with a plurality of certificates, each of the plurality of certificates pertaining to a different jurisdiction, and wherein the TVBD determines which of the plurality of certificates to use based on at least one of:
the TVBD's awareness of its location; and
an inquiry by the TVBD to a local database regarding which of the plurality of certificates to use.

* * * * *

UNITED STATES PATENT AND TRADEMARK OFFICE
CERTIFICATE OF CORRECTION

| | |
|---|---|
| PATENT NO. | : 9,325,677 B2 |
| APPLICATION NO. | : 12/781585 |
| DATED | : April 26, 2016 |
| INVENTOR(S) | : David G. Steer et al. |

It is certified that error appears in the above-identified patent and that said Letters Patent is hereby corrected as shown below:

In the Claims

Claim 11, Column 22, Line 20 replace "management encrypts" with --management component encrypts--

Signed and Sealed this
Fifth Day of July, 2016

Michelle K. Lee
*Director of the United States Patent and Trademark Office*